United States Patent [19]

Klesse et al.

[11] Patent Number: 5,185,387
[45] Date of Patent: Feb. 9, 1993

[54] AQUEOUS SYNTHETIC RESIN DISPERSION

[75] Inventors: Wolfgang Klesse, Mainz; Wilhelm Elser, Griesheim; Theodor Mager, Darmstadt; Juergen Christner, Bickenbach; Hertha Kraus, Pfungstadt; Peter Rossberg, Seeheim-Jugenheim; Marliese Weber, Roedermark, all of Fed. Rep. of Germany

[73] Assignee: Röhm GmbH, Darmstadt, Fed. Rep. of Germany

[21] Appl. No.: 760,473

[22] Filed: Sep. 16, 1991

Related U.S. Application Data

[63] Continuation-in-part of Ser. No. 492,612, Mar. 12, 1990, abandoned.

[30] Foreign Application Priority Data

Mar. 16, 1989 [DE] Fed. Rep. of Germany ....... 3908615

[51] Int. Cl.$^5$ ........................................... C08F 265/06
[52] U.S. Cl. .................................... 523/201; 524/458; 525/313; 525/902
[58] Field of Search ...................... 523/201; 524/458

[56] References Cited

U.S. PATENT DOCUMENTS

| 4,107,120 | 8/1978 | Plamondon et al. | 260/29.6 RB |
| 4,181,769 | 1/1980 | Plamondon et al. | 428/253 |
| 4,916,171 | 4/1990 | Brown et al. | 523/161 |

FOREIGN PATENT DOCUMENTS 0219868 4/1987 European Pat. Off. .

Primary Examiner—Paul R. Michl
Assistant Examiner—John J. Guarriello

[57] ABSTRACT

An aqueous synthetic resin dispersion having a minimum film forming temperature below 50° C., containing an emulsion polymer having a core/shell structure consisting of A) 65–90 percent by weight of a weakly crosslinked core polymer having a glass transition temperature, $T_g$, below 0° C. and an extensibility of at least 150 percent, and B) 10–35 percent by weight of an essentially non-crosslinked shell polymer having a $T_g$ below 60° C. the $T_g$ of the core polymer being at least 10 Centigrade degrees below that of the shell polymer.

25 Claims, No Drawings

AQUEOUS SYNTHETIC RESIN DISPERSION

This application is a continuation-in-part of copending application No. 07/492,612 filed Mar. 12, 1990.

The present invention relates to an aqueous synthetic resin dispersion which dries to form films having high extensibility even at low temperatures but having comparatively little tackiness, and to a method for making the same.

The synthetic resin dispersion of the invention is useful as a binder for coating agents, particularly exterior house paints and leather dressing agents. A minimum film forming temperature below 50° C., as well as a content of an emulsion polymer having a core/shell structure, are characteristic of the synthetic resin dispersion.

Emulsion polymers having a core/shell structure are known. According to U.S. No. 4,107,120, a latex suitable for strengthening textiles contains a polymer having a shell structure, the core of which is 30 to 60 percent by weight and the shell of which is 70 to 40 percent by weight. The core consists of a crosslinked polymer having a glass transition temperature below −20° C. The shell polymer has a glass transition temperature between −10° C. and 60° C. and is bound with the core material by way of a latent crosslinking system. The crosslinking occurs upon heating a film formed from the dispersion by the reaction of acrylamide units in the core polymer with N-methylolacrylamide units in the shell material. The strong crosslinking leads to a relatively low extensibility (extension at break).

A further field of use for synthetic resin dispersions is in crack bridging systems (cf. E. Bagda and H. Rusam, "Rissüberbrückende Beschichtungen", Bautenschutz and Bausanierung, 4/1981, pp. 133–138). For crack bridging systems, binders are used, inter alia, which consist of a very soft emulsion polymer and a minor amount of multiply unsaturated monomers which can be activated using UV-radiation. Under the influence of daylight, a thin skin of a crosslinked, and thus non-tacky, polymer gradually forms on the surface of the dried polymer film, which skin is not detrimental to the extensibility of the film so long as the light-induced crosslinking does not progress further into the interior of the film. However, it is considered disadvantageous that the tackiness of the film surface only disappears gradually, in dependence on the light conditions.

The invention has as its object to provide a physically-drying binder in the form of an aqueous synthetic resin dispersion which dries physically at low temperatures to give highly elastic films which are more or less non-tacky from the beginning.

The solution of this problem is found in the emulsion polymers according to the invention. The designation of the polymer phase involved as core material and shell material does not mean that the invention should be bound by any particular morphology of the latex particles. The term polymer phase is to be understood as meaning a portion of the emulsion polymer which is prepared during a temporally-limited segment of the emulsion polymerization and the composition of which differs from that of the foregoing or following phase. One speaks also of multi-stage polymerization or of graft polymerization. The phases in each particle can form a spherical core and a shell surrounding the core, but such a structure is not proved for the emulsion polymer of the invention. However, it is assumed that the phases in any event form domains which are spatially different from one another, but which touch one another and possibly may be linked to one another by chemical bonds.

The two-phase structure of the latex particles in any case has an essential influence on the properties of the film which is formed on drying of the synthetic resin dispersion. The high extensibility of the film stems from the soft, weakly crosslinked structure of the core material. This arises from the content of crosslinking monomers and a glass transition temperature below 0° C., preferably below −20° C. A limited content of about 5 to 20 percent by weight of hardening monomer units, such as methyl methacrylate or acrylonitrile, in the core material has an advantageous effect on the extensibility. The core material must form a considerable portion of the emulsion polymer, at least 50, preferably 65 to 90, percent by weight.

With the proviso that the shell model is morphologically pertinent, the shell material, corresponding to its fraction of 10 to 50 percent by weight of the emulsion polymer, forms a relatively thin shell around the core; the radius of the core, measured against the radius of the whole latex particle, is between 80 and 95 percent.

The shell material is essentially non-crosslinked. In any event, the amount of polyfunctional monomer units—also if they are contained as impurities in other monomers—must be kept so small that the extensibility of a film formed from the synthetic resin dispersion is not below 150 percent (according to ASTM D 683 M or the equivalent DIN 53455). The shell material may have only limited hardness, expressed by a glass transition temperature below 60° C., preferably −20° C. to 40° C. The glass transition temperature must, however, be at least 10 Centigrade degrees (C°) above that of the core material. Preferably, the difference is 20° to 60° C., in particular 20° to 40° C. If the shell material is too soft, i.e. if its glass transition temperature is too low, then the film will, to be sure, be elastic, but also tacky. If it is too hard, i.e. if the glass transition temperature is too high, then the extensibility strongly decreases. Only in the claimed region will the desired advantageous combination of properties of high extensibility and slight tackiness be achieved.

The aforementioned film properties make the synthetic resin dispersions according to the invention particularly suitable as binders for non-blocking coatings on non-rigid substrates. Among these are, on the one hand, flexible substrates such as leather, synthetic resin films, thin sheet metal, and textiles, and, on the other hand, rigid substrates which are, however, interrupted by cracks in which displacements of the pieces against each other can occur. Paints for substrates of the latter kind are characterized as crack bridging systems and are used in the construction industry for coating cracked plaster or masonry. For badly cracked surfaces, fibers or fabrics can be introduced into the coating layer to improve its cohesion.

Until now, physically drying crack bridging systems were for the most part applied in a plurality of layers. An elastic base layer assured the bridging over of cracks; a layer having a harder binder applied thereover removed the tackiness of the surface of the base layer. The synthetic resin dispersion of the present invention enables the application of a flexible, non-tacky paint in a single step.

Alkyl esters of acrylic acid having from 1 to 12, preferably from 2 to 8, carbon atoms in the alkyl portion are preferably used as monoethylenically unsaturated, free radically polymerizable monomers, the homopolymers of which have a glass transition temperature below 25° C. n-butyl acrylate and 2-ethylhexyl acrylate are the industrially most important monomers of this group which impart softness. Alkyl esters of methacrylic acid which contain alkyl portions having more than 4 carbon atoms and vinylalkyl ethers having 2 to 12 carbon atoms in the alkyl portions are also suitable.

Monomers imparting hardness, such as alkyl esters of methacrylic acid having 1 to 3 carbon atoms in the alkyl portion, acrylonitrile and/or methacrylonitrile, styrene, α-methyl styrene, vinyl acetate, vinyl chloride, or vinylidene chloride can be present in the core and shell materials as comonomers, the homopolymers of which have a glass transition temperature above 25° C. Unsaturated carboxylic acids, such as acrylic acid, methacrylic acid, or itaconic acid, hydroxyalkyl esters of acrylic acid and/or of methacrylic acid, acrylamide and/or methacrylamide and/or the N-alkyl derivatives thereof can be present in the structure of the core material in amounts up to 15 percent by weight, preferably from 0.1 to 5 percent by weight. The shell material can contain up to 20 percent by weight of the aforementioned monomers, preferably 1 to 10 percent by weight. Acrylic acid, methacrylic acid, and itaconic acid are particularly preferred. These polar monomers need not necessarily be distributed uniformly in the total material of the shell. It can be advantageous to concentrate these monomers in corresponding higher concentration in a part of the shell material. In this case, the polar monomers are predominantly or entirely incorporated into the part of the shell material that is last formed.

The amount of these comonomers is so measured that the copolymer which is formed at any time has the required glass transition temperature and the difference between the glass transition temperature of the core and that of the shell is at least 10 K.

The glass transition temperature ($t_{G.M}$) of the copolymer can be calculated with sufficient precision from the glass transition temperatures ($t_{G.i}$) of the homopolymers of the participating monomers according to the formula $$1/t_{G.M} = a/t_{G1} + b/t_{G2} + \ldots$$

where a and b are the relative amounts of the monomers 1 and 2.

The crosslinking monomers have at least two ethylenically unsaturated, free radically polymerizable groups, suitably non-conjugated groups such as allyl, acryl, or methacryl groups, in the molecule. Compounds having at least three such groups, which may be the same or different, but preferably are the same, are preferred. Examples of crosslinking monomers are di- and polyesters of acrylic acid and/or of methacrylic acid and di- or poly-functional alcohols, such as ethylene glycol diacrylate and dimethacrylate, butylene glycol diacrylate and dimethacrylate, pentaerythritol tri- or tetra- acrylate and methacrylate, trimethylolpropane triacrylate and trimethacrylate, and allyl acrylate and methacrylate, as well as triallyl cyanurate and triallyl isocyanurate. In many cases, graft crosslinking monomers which contain at least two ethylenically unsaturated, free radically polymerizable groups, among which is at least one allyl group, are particularly advantageous.

Crosslinking monomers are present in the structure of the core material in an amount from 0.1 to 2, preferably 0.2 to 0.6, percent by weight. The crosslinking is chosen just high enough so that the extensibility of the polymer film is only slightly decreased in comparison with that of a corresponding non-crosslinked emulsion polymer, but the resistance to blocking is already sufficient. Preferably the amount of crosslinking monomers is limited such that the extension at break of a film prepared from the synthetic resin dispersion is at least 150 percent (according to ASTM D 683 M or DIN 53455), preferably at least 400 percent, and more particularly above 600 percent. In a particular case, the degree of crosslinking is directed toward a particular use. Thus, for crack bridging systems a very high film extensibility, for example from 100 to 500 percent even at −10° C. is desired, whereas the surface should be sufficiently non-tacky even at temperatures up to 30° C. that dust and dirt do not adhere. For this purpose, a low content of crosslinking monomer is sufficient. For paints use for dressing leather, a higher resistance to blocking is required and a somewhat lower extensibility, but at least 150 percent, is accepted. In this case, the amount of crosslinking agent can lie in the upper part of the claimed region. At the same time, the shell material is adjusted to be harder.

The emulsion polymer can be prepared using conventional methods of emulsion polymerization in an aqueous phase in the presence of water soluble anionic, cationic, or nonionic emulsifiers or protective colloids, and of free radical-forming initiators such as alkali peroxydisulfates at temperatures from 20° to 100° C. The mixture of monomers for formation of the core material can be emulsified in the aqueous phase before the onset of polymerization or advantageously can be gradually added to the aqueous phase during the course of the polymerization according to the degree of conversion. In a corresponding way, the shell material is prepared in a second stage of the emulsion polymerization in the presence of the previously prepared latex of the core material.

The method of preparation is preferably so carried out that the monomer mixture of the first stage, which optionally may be emulsified in water, is added gradually under polymerization conditions to an aqueous phase which contains an emulsifier and a free radical forming initiator, and, in the second stage, the second monomer mixture, which also may optionally be emulsified in water, is added gradually under polymerization conditions to the latex which has formed. Using this procedure, 0.1 to 2, preferably 0.2 to 1, and more particularly from 0.2 to 0.6, percent by weight of a graft-crosslinking monomer which contains at least two ethylenically unsaturated, free radically polymerizable groups, among which is, suitably, at least one allyl group, preferably allyl acrylate or allyl methacrylate, is employed.

As a result of the crosslinking, the molecular weight of the core material is as a rule indeterminably high, whereas that of the non-crosslinked shell material is mostly in the region from 50,000 to 5 million. The synthetic resin dispersion is usually prepared with a solids content of 30 to 65 percent by weight and, if desired, is diluted with water before use. The pH value can be from 2 to 10 and mostly is from 6 to 9.5.

As a rule, the synthetic resin dispersion contains latex particles having a diameter from 40 to 1500 nanometers (nm), particularly 100 to 500 nm. The particle size distribution can be unimodal, bimodal, or polymodal. Dispersions having bi- or poly-modal particle size distributions ca be made according to the method described in DE-C 31 47 008 or U.S. No. 4,456,726, the latter incorporated herein by reference.

For the preparation of coating agents, conventional amounts of pigments, fillers, flow promoting agents, thickening agents, stabilizing agents, and the like can be added to the synthetic resin dispersions.

A better understanding of the present invention and of its advantages will be had by referring to the following specific Examples, given by way of illustration.

EXAMPLES

Preparation of the synthetic resin dispersion according to the invention

An aqueous solution of an anionic emulsifier is introduced into a Witt flask with a capacity of 2 to 6 liters having thereon a reflux condenser, stirrer, and container for adding further reagents and is warmed to 80° C. The sodium salt of triisobutylphenol polyglycol ether sulfate having a degree of ethoxylation of 7 is used as anionic emulsifier (A). After the addition of ammonium peroxydisulfate (APS) as the initiator, monomer emulsions I and II are uniformly added one after the other over a period of 4 hours. The synthetic resin dispersion so formed is then adjusted to pH 7.0 with aqueous ammonia and then combined at 50° C. with stabilizing nonionic emulsifiers in the form of a 35-percent aqueous solution. As such, are used either isononylphenol polyglycol ether having a degree of ethoxylation of 50 (B) or a mixture (C) of two nonylphenol polyglycol ethers with degrees of ethoxylation of 9 and 100 in a ratio of 75:25, or octylphenol polyglycol ether having a degree of ethoxylation of 16 (D). After cooling to room temperature, the pH is adjusted to 9 with aqueous ammonia.

The compositions of the contents of the reaction vessel and of emulsions I and II are given in Table 1 for Examples 1-18. Table 2 contains the percentage composition of the core and shell materials and their relationship by weight. The minimum film forming temperatures of all dispersions are at the freezing point, i.e. 0° C. All further physical data and the results of testing of the synthetic resin dispersions for industrial uses for Example 1-21 are contained in Table 3.

Example 16

The method of this Example deviates from the general technique described above to the extent that the contents of the reaction vessel additionally contain 2 g of a 30 % seed latex having an average particle size diameter of 40 nm, the particles of which are composed of BA, MMA, and MA (53:46:1 pbw). 70 minutes after onset of the addition of emulsion I, 20 g of the same seed latex are again added. A bimodal dispersion is formed which contains 25 percent by weight of particles having an average diameter of 125 nm and 75 percent by weight of particles having an average diameter of 400 nm.

Example 18

In this Example, the shell material is prepared in two stages. Emulsion II is divided into two parts in a weight ratio 25:5, of which the first contains 5 percent by weight of methacrylic acid and the second 15 percent by weight of methacrylic acid. In Tables 1 and 2, the two parts of emulsion II are reported in two lines.

By drying a thin layer of the dispersion, a film was prepared on which a tension-extension measurement was made according to DIN 53455. The extensibility was 490 percent, the tension at break 6.6 MPa. The blocking point of the film was 30° C.

TABLE 1

POLYMER BATCH COMPOSITION (IN PARTS BY WEIGHT)

| Ex. No. | In flask EMA | In flask APS | In flask H₂O | BA | CMN | Emulsion I CRS | EMA | MA | H₂O | BA | MMA | Emulsion II MA | EMA | APS | H₂O | Stabilizing Emulsion Amt. | Kind |
|---|---|---|---|---|---|---|---|---|---|---|---|---|---|---|---|---|---|
| 1 | 0.4 | 0. | 400 | 690 | — | 7.0 TAC | 2.1 | 3.5 | 420 | 171 | 120 | 9 | 0.9 | 0.5 | 183 | 35 | C |
| 2 | 0.4 | 0.5 | 400 | 695 | — | 1.4 AL | 1.47 | 3.5 | 400 | 171 | 120 | 9 | 0.63 | 0.5 | 171 | 35 | B |
| 3 | 1.2 | 1.5 | 1200 | 2083 | — | 6.3 AL | 4.41 | 10.5 | 1197 | 513 | 360 | 27 | 1.89 | 1.5 | 513 | 105 | B |
| 4 | 0.4 | 0.5 | 400 | 692 | — | 4.2 AL | 1.47 | 3.5 | 400 | 171 | 120 | 9 | 0.63 | 0.5 | 171 | 35 | B |
| 5 | 0.4 | 0.5 | 400 | 690 | — | 7.0 AL | 1.47 | 3.5 | 400 | 171 | 120 | 9 | 0.63 | 0.5 | 171 | 35 | B |
| 6 | 0.4 | 0.5 | 400 | 794 | — | 2.4 AL | 2.4 | 4.0 | 485 | 114 | 80 | 6 | 0.6 | 0.5 | 121 | 35 | C |
| 7 | 1.0 | 1.25 | 1000 | 1736 | — | 5.25 AL | 5.25 | 8.8 | 1073 | 427 | 300 | 23 | 2.25 | 1.3 | 460 | 88 | C |
| 8 | 0.4 | 0.5 | 400 | 645 | — | 1.95 AL | 1.95 | 3.3 | 394 | 200 | 140 | 11 | 1.05 | 0.5 | 212 | 35 | C |
| 9 | 0.4 | 0.5 | 400 | 794 | — | 2.4 AL | 2.4 | 4.0 | 485 | 130 | 70 | 4 | 0.6 | 0.5 | 121 | 35 | C |
| 10 | 0.4 | 0.5 | 400 | 554 | 240 MMA | 2.4 AL | 2.4 | 4.0 | 485 | 130 | 66 | 4 | 0.6 | 0.5 | 121 | 35 | C |
| 11 | 0.4 | 0.5 | 400 | 741 | 132 MMA | 2.4 AL | 2.4 | 4.0 | 485 | 130 | 66 | 4 | 0.6 | 0.5 | 121 | 35 | C |
| 12 | 0.4 | 0.5 | 400 | 694 | — | 2.1 AL | 2.1 | 3.5 | 427 | 195 | 96 | 9 | 0.9 | 0.5 | 183 | 35 | C |
| 13 | 0.4 | 0.5 | 400 | 694 | — | 2.1 AL | 2.1 | 3.5 | 427 | 210 | 81 | 9 | 0.9 | 0.5 | 183 | 35 | C |
| 14 | 0.4 | 2.0 | 400 | 746 | 48 AN | 2.4 AL | 2.4 | 4.0 | 488 | 130 | 66 | 4 | 0.6 | 0.8 | 122 | 35 | C |
| 15 | 0.12 | 1.0 | 785 | 2020 | 360 MMA | 7.2 AL | 4.8 | 12.0 | 956 | 390 | 198 | 12 | 1.2 | 1.0 | 242 | 70 | C |
| 16* | 0.04 | 0.4 | 320 | 808 | 144 MMA | 2.9 AL | 1.53 | 4.8 | 369 | 156 | 79 | 5 | 0.38 | 0.4 | 92 | 28 | C |
| 17 | 1.08 | 0.54 | 423 | — | 500 EA | 1.52 AL | 3.03 | 2.5 | 472 | 97.2 EA | 112 | 6.5 | 1.3 | 0.1 | 202 | 23 | D |
| 18* | 1.08 | 0.54 | 432 | 372 | 124 MMA | 5.04 AL | 3.1 | 2.5 | 459 | 63.5 | 108 | 9 | 1.08 | 0.1 | 163 | — | — |
| | | | | | | | | | | 12.6 | 18 | 5.4 | 0.2 | 0.02 | 32.6 | | |
| 19 | 0.4 | 0.5 | 400 | 686 | — | 10.5 TMPA | 2.1 | 3.5 | 427 | 171 | 120 | 9 | 0.9 | 0.5 | 183 | 35 | C |
| 20 | 0.4 | 0.5 | 400 | 690 | — | 7.0 TAIC | 2.1 | 3.5 | 427 | 171 | 120 | 9 | 0.9 | 0.5 | 183 | 35 | C |
| 21 | 0.4 | 0.5 | 400 | 741 | 132 MMA | 2.4 ALA | 2.4 | 4.0 | 485 | 130 | 66 | 4 | 0.6 | 0.5 | 121 | 35 | C |

In Tables 1 and 2:
APS = ammonium peroxydisulfate
MA = methacrylic acid
AL = allyl methacrylate
EA = ethyl acrylate
BA = n-butyl acrylate
MMA = methyl methacrylate
CMN = comonomer
CRS = crosslinking agent
TAC = triallyl cyanurate
AN = acrylonitrile
TMPA = trimethylolpropane triacrylate
TAIC = triallyl isocyanurate
ALA = allyl acrylate
EMA = Emulsifier A = triisobutylphenol - 7 ethylene oxide, sulfated, Na salt
Emulsifier B = isononylphenol - 50 ethylene oxide
Emulsifier C = nonylphenol - 9 ethylene oxide/100 ethylene oxide 75:25
Emulsifier D = octylphenol - 16 ethylene oxide
*Deviating Method, see specific disclosure

TABLE 2

COMPOSITION OF THE CORE AND SHELL MATERIALS (IN PERCENT BY WEIGHT)

| Ex. No. | Core Material BA | CMN | CRS | MA | Shell Material BA | MMA | MA | Ratio by weight Core:Shell |
|---|---|---|---|---|---|---|---|---|
| 1 | 98.5 | — | 1 TAC | 0.5 | 57 | 40 | 3 | 70:30 |
| 2 | 99.3 | — | 0.2 AL | 0.5 | 57 | 40 | 3 | 70:30 |
| 3 | 99.2 | — | 0.3 AL | 0.5 | 57 | 40 | 3 | 70:30 |
| 4 | 98.9 | — | 0.6 AL | 0.5 | 57 | 40 | 3 | 70:30 |
| 5 | 98.5 | — | 1.0 AL | 0.5 | 57 | 40 | 3 | 70:30 |
| 6 | 99.2 | — | 0.3 AL | 0.5 | 57 | 40 | 3 | 80:20 |
| 7 | 99.2 | — | 0.3 AL | 0.5 | 57 | 40 | 3 | 70:30 |
| 8 | 99.2 | — | 0.3 AL | 0.5 | 57 | 40 | 3 | 65:35 |
| 9 | 99.2 | — | 0.3 AL | 0.5 | 65 | 33 | 2 | 80:20 |
| 10 | 69.2 | 30 MMA | 0.3 AL | 0.5 | 65 | 33 | 2 | 80:20 |
| 11 | 84.2 | 15 MMA | 0.3 AL | 0.5 | 65 | 33 | 2 | 80:20 |
| 12 | 99.2 | — | 0.3 AL | 0.5 | 65 | 32 | 3 | 70:30 |
| 13 | 99.2 | — | 0.3 AL | 0.5 | 70 | 27 | 3 | 70:30 |
| 14 | 93.2 | 6 AN | 0.3 AL | 0.5 | 65 | 33 | 2 | 80:20 |
| 15 | 84.2 | 15 MMA | 0.3 AL | 0.5 | 65 | 33 | 2 | 80:20 |
| 16* | 84.2 | 15 MMA | 0.3 AL | 0.5 | 65 | 33 | 2 | 80:20 |
| 17 | — | 99.2 EA | 0.3 AL | 0.5 | 45 EA | 52 | 3 | 70:30 |
| 18* | 73.8 | 24.6 MMA | 1.0 AL | 0.5 | 35 | 60 | 5 | 70:25 |
|  |  |  |  |  | 35 | 50 | 15 | —:5 |
| 19 | 98.0 | — | 1.5 TMPA | 0.5 | 57 | 40 | 3 | 70:30 |
| 20 | 98.5 | — | 1.0 TAIC | 0.5 | 57 | 40 | 3 | 70:30 |
| 21 | 84.2 | 15 MMA | 0.3 ALA | 0.5 | 65 | 33 | 2 | 80:20 |

Testing for industrial uses

A. Determination of the average particle size

The diameter of the unimodal synthetic resin dispersion was determined by auto correlation spectroscopy using a "Nanosizer" (TM) measuring apparatus of Coulter Electronics Ltd. In the case of the bimodal synthetic resin dispersion of Example 16, ultracentrifugation according to Scholtan and Lange, Kolloidzeitschrift und Zeitschrift for Polymere, 250 (1979) 782, was employed.

B. Preparation and testing of a paint 1000 pbw of the paint having a solids content of about 63 percent by weight and a pigment volume concentration of about 30 percent have the following composition (in pbw). For registered trademarks, the designation TM and the name of the supplier have been given.

| | |
|---|---|
| 92 | water. |
| 4 | polyacrylic acid, ammonium salt, as a dispersing auxiliary (ROHAGIT SL 252, TM Röhm Gmbh). |
| 2 | chlorinated acetamide, as a preservative (KM101, TM Riedel-de-Haen AG). |
| 2 | a mixture of aromatic hydrocarbons, hydrophobized silica, a synthetic copolymer, and nonionics, as a defoaming agent (NOPCO 8034, TM Münzing Chemie GmbH), |
| 190 | titanium dioxide, rutile type (R-KB2, TM Farbenfabriken Bayer), |
| 30 | micronized glitter (MICRO-MICA W1, TM Norwegian Talc), |
| 30 | diatomaceous earth (CELITE 281, TM Johns-Manville Int. Corp.), |
| 125 | barite (EWO, TM Sachtleben Chemie GmbH). |
| 486 | 50% synthetic resin dispersion according to Examples 1-16, |
| 8 | propylene glycol, |
| 8 | mixed dicarboxylic acid esters, as a film forming auxiliary (LUSOLVAN FBH, TM BASF AG), |
| 15 | nonionic polyurethane thickening agent, 10% in water (BORCHIGEL L 75, TM Gebr. Borchers AG). |
| 3 | aminomethyl propanol, as a stabilizing agent (AMP 90, TM Angus Chemie GmbH). and |
| 4 | an aqueous emulsion of crosslinked polyacrylic acid esters, as a thickening agent (ROHAGIT SD15, TM Röhm GmbH). |

C. Determining extensibility

Paints of the composition given under A are applied to glass plates in several layers which are covered with a Teflon film. When dried, the thickness of the paint is 0.7 mm. After drying for 8 days at 23° C., the painted plates are stored for 2 weeks in deionized water and then are brought to constant weight at 23° C. in an atmosphere of 50 percent relative humidity.

Strips 15×70 mm in size are cut from the paint films prepared in this way and are clamped to have a free length of 50 mm. The strips are stretched in a tensile testing machine at a rate of 50 mm/min at a temperature of −10° C. and the tension-extension-diagram according to DIN 53455 is taken. The cold extensibility determined in this way (epsilon-R/10° C.) is reported in percent. If the same measurement is made at room temperature on an unpigmented film prepared from the pure synthetic resin dispersion, the result is reported as extensibility (epsilon-R/23° C.).

D. Testing of the blocking of the prepared paints

For determination of the blocking point, a weakly absorbent paper is coated with the paint described above under A using a 0.5 mm drawn straight edge and dried for 16 hours at room temperature and for a further 3 hours at 60° C.

Strips 25×170 mm in size are cut from the coated paper, folded in the middle so that the coated sides are in contact, and pressed for one hour at various temperatures with a load of 50 g/cm². The highest temperature at which the coatings can still be separated from each other without damage is designated as the blocking point.

E. Preparation and testing of a leather grounding

| Composition in parts by weight: | |
|---|---|
| 250 | synthetic resin dispersion according to Example 17, pH 7.4, 40%. |
| 520 | water. |
| 40 | 30% aqueous solution of casein. |
| 30 | 15-20% aqueous emulsion of Japan wax, anionically and nonionically emulsified. |
| 100 | 10 to 20% aqueous dispersion of carbon black, anionically emulsified, and |
| 50 | mixture of glycol ethers, ketones, and nonionics, as a penetration agent. |

This preparation was applied to full grain shoe top leather by a double spray application. The leather was then ironed at 70° C. at a pressure of 150 bar and the same grounding was again sprayed on twice. The finished grounded leather was subjected to industrial use testing without any final coating. On ironing with a metal stamp at 120° C., the surface was not damaged. The leather can be stacked without blocking. Flex testing with a Bally fleximeter gives 20,000 bends for the leather when wet and 50,000 bends for the leather when dry until the onset of damage. In a test of resistance to rubbing according to Veslic using a felt stamp loaded at 1 kg/cm$^2$, the dry leather tolerates 150 rubbing strokes with the dry and with the wet felt. The wet leather survives 150 rubbing strokes with the dry felt.

TABLE 3

PHYSICAL PROPERTIES OF THE SYNTHETIC RESIN DISPERSIONS

| Ex. No. | Glass Trans'n Temp. (°C.) | | Solids Content (% by weight) | Particle Diam (nanometers) | Viscosity (mPa.s) | Extensibility (Percent) at | | Blocking Point (°C.) of pigmented film |
|---|---|---|---|---|---|---|---|---|
| | Core | Shell | | | | 23° C. unpigmented | −10° C. pigmented | |
| 1 | −44 | 2 | 50 | 185 | 9600 | — | 250 | 90 |
| 2 | −44 | 2 | 50 | 165 | 1950 | — | 240 | 40 |
| 3 | −44 | 2 | 50 | 190 | 925 | — | 260 | 90 |
| 4 | −43 | 2 | 50 | 170 | 1450 | — | 130 | 90 |
| 5 | −43 | 2 | 50 | 160 | 1825 | — | 90 | 90 |
| 6 | −44 | 2 | 50 | 150 | 47500 | 1900 | 180 | 60 |
| 7 | −44 | 2 | 50 | 160 | 10000 | 1000 | 120 | 90 |
| 8 | −44 | 2 | 50 | 180 | 33500 | 840 | 65 | 90 |
| 9 | −44 | −9 | 50 | 200 | 600 | — | 210 | 90 |
| 10 | −14 | −9 | 50 | 160 | 4400 | 1310 | 150 | 90 |
| 11 | −30 | −9 | 50 | 150 | 5600 | — | 240 | 90 |
| 12 | −44 | −9 | 50 | 175 | 900 | 1630 | 195 | 90 |
| 13 | −44 | −14 | 50 | 180 | 850 | 940 | 180 | 90 |
| 14 | −3 | −9 | 50 | 195 | 600 | — | 190 | 90 |
| 15 | −0 | −9 | 60 | 485 | 820 | — | 146 | 90 |
| 16 | −30 | −9 | 60 | bimodal | 1100 | — | 261 | 90 |
| 17 | −19 | 36 | 40 | 86 | 2000 | — | — | — |
| 18 | −18 | 35/35-40 | 40 | 100 | 16000 | 490 | — | — |
| 19 | −43 | 2 | 50 | 165 | 5700 | — | 260 | 40 |
| 20 | −44 | 2 | 50 | 180 | 8000 | — | 230 | 90 |
| 21 | −30 | −9 | 50 | 160 | 4800 | — | 220 | 90 |

What is claimed is:

1. An aqueous synthetic resin dispersion having a minimum film forming temperature below 50° c. containing an emulsion polymer with a core/shell structure consisting of
A) 65-90 percent by weigh of a weakly crosslinked core polymer having a glass transition temperature below 0° C. and an extension at break of at least 150 percent, said core polymer comprising
   1) at least one monoethylenically unsaturated, free radically polymerizable monomer, the homopolymer of which has a glass transition temperature below 25° C., and
   2) 0.1-2.0 percent, by weight of said core polymer, of at least one crosslinking monomer containing at least two no-conjugated ethylenically unsaturated, free radically polymerizable groups, and
B) 10-35 percent by weight of an essentially non-crosslinked shell polymer having a glass transition temperature below 60° C., comprising
   1) at least one monoethylenically unsaturated, free radically polymerizable monomer, the homopolymer of which has a glass transition temperature below 25° C., and
   2) at least one monoethylenically unsaturated, free radically polymerizable monomer, the homopolymer of which has a glass transition temperature above 25° C.,
the glass transition temperature of said core polymer being at least 10 Centigrade degrees below that of said shell polymer, said shell polymer containing up to 20 percent by weight of monomers selected from the group consisting of acrylic acid, methacrylic acid, hydroxyalkyl esters of acrylic acid, hydroxyalkyl esters of methacrylic acid, acrylamide, methacrylamide, and N-alkyl derivatives thereof.

2. An synthetic resin dispersion having a minimum film forming temperature below 50° C., containing an emulsion polymer with a core/shell structure consisting of
A) 65-90 percent by weigh of a weakly crosslinked core polymer having a glass transition temperature below 0° C. and an extension at reak of at least 150 percent at 23° C., said core polymer comprising
   1) at least one monoethylenically unsaturated, free radically polymerizable monomer, the homopolymer of which has a glass transition temperature below 25° C., and
   2) 0.1-2.0 percent by weight of at least one crosslinking monomer containing at least two ethylenically unsaturated, free radically polymerizable groups of which at least one is an allyl group, and
B) 10-35 percent by weight of an essentially non-crosslinked shell polymer having a glass transition temperature below 60° C., comprising
   1) at least one monoethylenically unsaturated, free radically polymerizable monomer, the homopolymer of which has a glass transition temperature below 25° C., and 2) at least one monoethylenically unsaturated, free radically polymerizable monomer, the homopolymer of which has a glass transition temperature above 25° C., the glass transition temperature of said core polymer being at least 10 Centigrade degrees below that of said shell polymer, said shell polymer containing up to 20 percent by weigh of monomers selected from eh group consisting of acrylic acid, methacrylic acid, hydroxyalkyl esters of acrylic acid, hydroxyalkyl esters of methacrylic acid, acrylamide, methacrylamide, and N-alkyl derivatives thereof.

3. A method for the preparation of an aqueous dispersion of an emulsion polymer as in claim 1, which method comprises emulsion polymerizing, in a first stage, 65 to 90 percent, by weight of all monomers polymerized in said method, of a first monomer mixture comprising p1 1) at least one monoethylenically unsaturated, free radically polymerizable monomer, the homopolymer of which has a glass transition temperature below 25° C., and 2) at least one graft crosslinking monomer which contains at least two non-conjugated ethylenically unsaturated free radically polymerizable groups of which at least one is an allyl group, by gradually adding said mixture under polymerization conditions to an aqueous phase containing an emulsifier and a free radical forming initiator, whereby a latex of a core polymer si formed, and, in a second stage, emulsion polymerizing 10 to 35 percent, by weight of all monomers polymerized in said method, of a second monomer mixture comprising 1) at least one monoethylenically unsaturated, free radially polymerizable monomer, the homopolymers of which has a glass transition temperature below 25° C., and 2) at least one monoethylenically unsaturated, free radically polymerizable monomer, the homopolymer of which has a glass transition temperature above 25° C., by gradually adding said second monomer mixture under polymerization conditions to the latex of said core polymer formed in said fist stage, whereby a shell polymer is formed, the monomers present in said first and second monomer mixtures being such that the glass transition temperature of said core polymer is below 0° C., that of said shell polymer is below 60° C., and the glass transition temperature of said core polymer is at least 10 Centigrade degrees below the glass transition temperature of said shell polymer, said shell polymer containing up to 20 percent by weight of monomers selected from the group consisting of acrylic acid, methacrylic acid, hydroxyalkyl users of acrylic acid, hydroxyalkyl esters of methacrylic acid, acrylamide, methacrylamide, and N-alkyl derivatives thereof.

4. An aqueous synthetic resin dispersion as in claim 1 wherein said crosslinking monomer A) 2) contains at least three non-conjugated ethylenically unsaturated free radically polymerizable groups.

5. An aqueous synthetic resin dispersion as in claim 4 wherein said three non-conjugated groups are the same.

6. An aqueous synthetic resin dispersion as in claim 5 wherein said same three non-conjugated groups are selected from the group consisting of allyl, acryl, and methacryl groups.

7. An aqueous synthetic resin dispersion as in claim 1 wherein said crosslinking monomer A) 2) is triallyl cyanurate or triallyl isocyanurate.

8. An aqueous synthetic resin dispersion as in claim 1 wherein said crosslinking monomer A) 2) contains at least one allyl group.

9. An aqueous synthetic resin dispersion as in claim 1 wherein said crosslinking monomer A) 2) is free of allyl groups.

10. An aqueous synthetic resin dispersion as in claim 1 wherein the amount of crosslinking monomer A) 2) is such that the extension of said core polymer at break is at least 400 percent.

11. An aqueous synthetic resin dispersion as in claim 1 wherein the amount of crosslinking monomer A) 2) is such that the extension of said core polymer at break as is at least 600 percent.

12. An aqueous synthetic resin dispersion as in claim 1 which additionally contains a pigment.

13. An aqueous synthetic resin dispersion as in claim 1 wherein said core polymer additionally comprises at leas one further monoethylenically unsaturated monomer, different from but copolymerizable with the other monomers of said core polymer, and not capable of crosslinking.

14. An aqueous synthetic resin dispersion as in claim 1 wherein said shell polymer additionally comprises at least one further monoethylenically unsaturated monomer, different from burt copolymerizable with the other monomers of said shell polymer.

15. An aqueous synthetic resin dispersion as in claim 2 wherein at least one crosslinking monomer A) 2) is selected from the group consisting of allyl acrylate and allyl methacrylate.

16. An aqueous synthetic resin dispersion as in claim 2 wherein said crosslinking monomer A) 2) is triallylcyanurate.

17. An aqueous synthetic resin dispersion as in claim 2 wherein the amount of crosslinking monomer A) 2) is such that the extension of said core polymer at break is at least 400 percent.

18. An aqueous synthetic resin dispersion as in claim 2 wherein the amount of crosslinking monomer A) 2) is such that the extension of said core polymer at break is at least 600 percent.

19. An aqueous synthetic resin dispersion as in claim 2 which additionally contains a pigment.

20. An aqueous synthetic resin dispersion as in claim 2 wherein said core polymer additionally comprises at least one further monoethylenically unsaturated monomer, different from but copolymerizable with the other monomers of said core polymer, and not capable of crosslinking.

21. An aqueous synthetic resin dispersion as in claim 2 wherein said shell polymer additionally comprises at least one further monoethylenically unsaturated monomer, different from but copolymerizable with the other monomers of said shell polymer.

22. A method as in claim 3 wherein the monomer mixture polymerized in said first stage is dispersed in water.

23. A method as in claim 3 wherein the monomer mixture polymerized in said second stage is dispersed in water.

24. A method as in claim 3 wherein said first monomer mixture additionally comprises at least one further monoethylenically unsaturated monomer, different from but copolymerizable with the other monomers in said mixture and not capable of crosslinking.

25. A method as in claim 3 wherein said second monomer mixture additionally comprises at least one further monoethylenically unsaturated monomer, different from but copolymerizable with the other monomers in said mixture.

* * * * *